US012779331B2

(12) United States Patent
Raji et al.

(10) Patent No.: US 12,779,331 B2
(45) Date of Patent: Nov. 3, 2026

(54) VIDEO GAME AUDIO GENERATION

(71) Applicant: Electronic Arts Inc., Redwood City, CA (US)

(72) Inventors: Shahab Raji, Foster City, CA (US); Igor Borovikov, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 135 days.

(21) Appl. No.: 18/621,786

(22) Filed: Mar. 29, 2024

(65) Prior Publication Data

US 2025/0303294 A1 Oct. 2, 2025

(51) Int. Cl.
*A63F 13/54* (2014.01)
*G10L 19/00* (2013.01)
*G10L 19/032* (2013.01)

(52) U.S. Cl.
CPC ............ *A63F 13/54* (2014.09); *G10L 19/032* (2013.01); *G10L 2019/0002* (2013.01)

(58) Field of Classification Search
CPC ................... A63F 13/54; G10L 19/032; G10L 2019/0002
See application file for complete search history.

(56) References Cited

U.S. PATENT DOCUMENTS

2022/0414338 A1* 12/2022 Cho ........................ G06F 40/30
2024/0029691 A1* 1/2024 Mccoy ................. G10H 1/0025
2024/0261685 A1* 8/2024 Dorn ....................... H04S 7/302

OTHER PUBLICATIONS

Aaron van den Oord, and Oriol Vinyals. "Neural discrete representation learning." Advances in neural information processing systems 30, dated 2017.

* cited by examiner

*Primary Examiner* — Thomas H Henry
(74) *Attorney, Agent, or Firm* — Gray Ice Higdon

(57) ABSTRACT

This specification describes a method for generating audio for a video game. The method is implemented by one or more processors. The method comprises: obtaining, by one or more of the processors, acoustic feature data comprising a value for one or more audio characteristics; selecting, by one or more of the processors, a first latent embedding from a codebook of latent embeddings based upon processing the acoustic feature data using an acoustic machine learning model; and generating, by one or more of the processors, an output audio sample based upon the selected first latent embedding.

20 Claims, 10 Drawing Sheets

VIDEO GAME AUDIO GENERATION

BACKGROUND

Video games may feature a variety of environments requiring a variety of different sounds. Sound libraries comprising various recorded audio samples of sound effects may be used to provide the necessary sounds for a particular environment. However, sound libraries are limited in the number of audio samples that they can provide and therefore audio may become repetitive when played frequently. This may break player immersion and reduce the player's gameplay experience.

SUMMARY

In accordance with a first aspect, there is provided a method for generating audio for a video game, the method implemented by one or more processors, the method comprising: obtaining, by one or more of the processors, acoustic feature data comprising a value for one or more audio characteristics; selecting, by one or more of the processors, a first latent embedding from a codebook of latent embeddings based upon processing the acoustic feature data using an acoustic machine learning model; and generating, by one or more of the processors, an output audio sample based upon the selected first latent embedding.

In accordance with a second aspect, there is provided a system comprising one or more processors and one or more computer readable storage media. The computer readable storage media comprises processor readable instructions to cause the one or more processors to carry out a method comprising: obtaining, by one or more of the processors, acoustic feature data comprising a value for one or more audio characteristics; selecting, by one or more of the processors, a first latent embedding from a codebook of latent embeddings based upon processing the acoustic feature data using an acoustic machine learning model; and generating, by one or more of the processors, an output audio sample based upon the selected first latent embedding.

In accordance with a third aspect, there is provided one or more non-transitory computer-readable storage media comprising instructions which, when executed by one or more processors, cause the one or more processors to carry out a method comprising: obtaining, by one or more of the processors, acoustic feature data comprising a value for one or more audio characteristics; selecting, by one or more of the processors, a first latent embedding from a codebook of latent embeddings based upon processing the acoustic feature data using an acoustic machine learning model; and generating, by one or more of the processors, an output audio sample based upon the selected first latent embedding.

In accordance with a fourth aspect, there is provided a method for generating audio for a video game, the method implemented by one or more processors, the method comprising: selecting, by one or more of the processors, a first latent embedding from a codebook of latent embeddings based upon a first label; selecting, by one or more of the processors, a second latent embedding from the codebook based upon a second label; combining, by one or more of the processors, the first and second latent embeddings to generate a combined latent embedding; and decoding the combined latent embedding to generate an output audio sample.

In accordance with a fifth aspect, there is provided a system comprising one or more processors and one or more computer readable storage media. The computer readable storage media comprises processor readable instructions to cause the one or more processors to carry out a method comprising: selecting a first latent embedding from a codebook of latent embeddings based upon a first label; selecting a second latent embedding from the codebook based upon a second label; combining the first and second latent embeddings to generate a combined latent embedding; and decoding the combined latent embedding to generate an output audio sample.

In accordance with a sixth aspect, there is provided one or more non-transitory computer-readable storage media comprising instructions which, when executed by one or more processors, cause the one or more processors to carry out a method comprising: selecting, by one or more of the processors, a first latent embedding from a codebook of latent embeddings based upon a first label; selecting, by one or more of the processors, a second latent embedding from the codebook based upon a second label; combining, by one or more of the processors, the first and second latent embeddings to generate a combined latent embedding; and decoding, by one or more of the processors, the combined latent embedding to generate an output audio sample.

DETAILED DESCRIPTION

General Definitions

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game" as used in some embodiments described herein, is a virtual interactive environment in which players engage.

The systems and methods described in this specification enable the generation of audio for video games. The system is capable of generating new audio based upon existing audio samples. The system can generate new audio similar to the existing audio sample by mapping audio characteristics of the existing audio sample to one of a plurality of latent embeddings. The system can then generate a new audio sample based upon the selected latent embedding using a decoder machine learning model which may be a generative neural network for example. As such, the system can expand on the available audio samples and produce a variety of audio for a video game in order to reduce the need to repeatedly play the same audio.

Furthermore, the audio characteristics of the existing audio sample may be modified and provided to the system in order to produce audio with a desired audio characteristic. In further embodiments, the system can enable the generation of mixed or hybrid sounds by selecting additional latent embeddings and combining the latent embeddings. The additional latent embeddings can be selected based upon a label or the acoustic characteristics of another audio sample. As such, new audio mixtures can be generated for use by the video game that are not available in a sound library.

Figure 1:
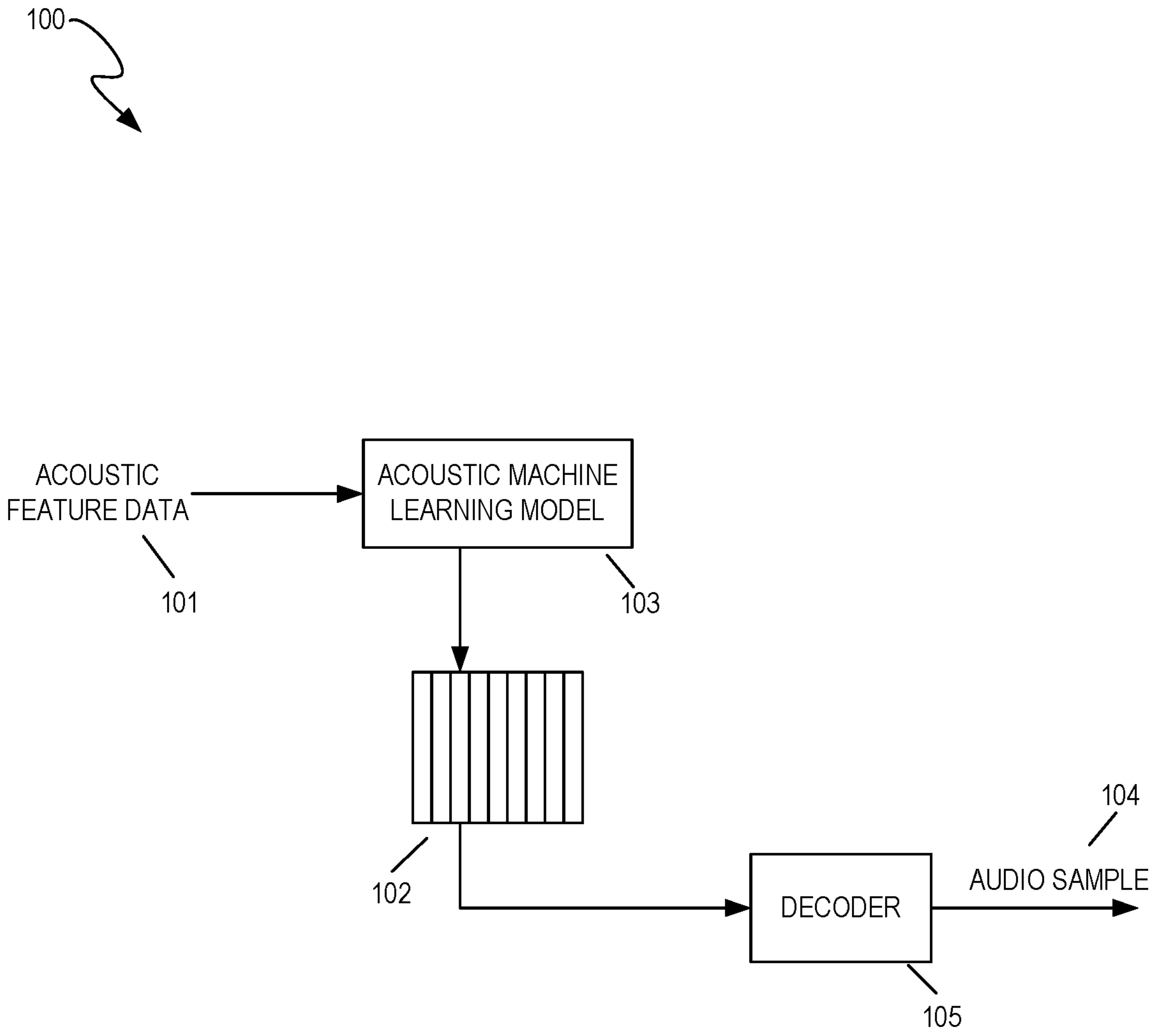
FIG. 1 is a schematic block diagram illustrating an example video game audio generation system according to an embodiment.

FIG. 1 is a schematic block diagram of an example video game audio generation system 100. The system 100 may be implemented by one or more processors located in one or more locations. The system 100 may comprise a server, desktop computer, a mobile device such as a laptop, smartphone or tablet, a video game console or any other suitable computing apparatus. The system 100 may be a distributed system or cloud-based system. The system 100 may be part of a video game or may interface with a video game to enable real-time generation of audio for the video game. Alternatively, the system 100 may be an "offline" system for generating audio during the development of the video game. The generated audio may be stored and made accessible to the video game for subsequent retrieval by the video game during runtime.

The system 100 is configured to obtain acoustic feature data 101 comprising a value for one or more audio characteristics. The one or more audio characteristics may be descriptive of a sound. For example, the one or more audio characteristics may include characteristics/properties of sounds that can be manipulated by a synthesizer, such as ADSR (Attack-Decay-Sustain-Release) envelope, distortion, and modulation amongst others. In general, the audio characteristics describe a sound at a higher-level than lower-level features of a recoded sound such as raw digital samples of a waveform, or FFT-like spectral features. The acoustic feature data may be a semantic representation of a sound.

The acoustic feature data 101 may be based upon MIDI audio data. The acoustic feature data 101 may be generated from an existing audio sample and corresponding values for the one or more audio characteristics may be determined by the system 100 itself or by an external system and provided to the system 100. In some implementations, the acoustic feature data 101 comprises at least one value that has been modified from the values corresponding to an existing audio sample based upon a desired change in the corresponding audio characteristic. For example, an existing audio sample may be that of a dog bark. The existing dog bark may have a low pitch corresponding to a large dog. The values of the acoustic feature data corresponding to pitch may be adjusted to correspond better to the bark of a smaller dog. The other values of the acoustic feature data may remain unchanged. The modified acoustic feature data may be provided to the system 100 for generating a sound based upon the modified acoustic feature data and characteristics. The modification may be carried out using an external system or the system 100 may be configured with an interface to allow a user to carry out modifications to acoustic feature data of existing audio samples.

The system 100 is further configured to select a first latent embedding from a codebook 102 of latent embeddings based upon processing the acoustic feature data 101 using an acoustic machine learning model 103. A latent embedding is a representation of the acoustic feature data in a different representational space. This representational space may provide for grouping together of similar concepts and greater separation of different concepts. A latent embedding comprises an indexable collection of numerical values, typically a vector or matrix or higher-ordered tensor. In this case, the latent embedding space is defined by a plurality of latent embeddings in a codebook and therefore provides a discrete latent space rather than a continuous latent space. The codebook 102 may be learned as described in more detail below.

The acoustic machine learning model 103 may be any type of machine learning model. For example, the acoustic machine learning model 103 may comprise one or more neural network layers. In one example, the acoustic machine learning model 103 comprises a two-layer forward feedforward neural network. Training of the acoustic machine learning model 103 is also described in more detail below.

The system 100 may be configured to select the first latent embedding based upon the processing of the acoustic machine learning model 103 in any suitable way. In one example, the acoustic machine learning model 103 is configured to provide an encoding of the acoustic feature data 101 having the same dimensionality as the latent embeddings. The nearest latent embedding in the codebook 102 to the encoding of the acoustic feature data 101 may be selected as the latent embedding.

In another example, the acoustic machine learning model 103 may be configured to directly output an index corresponding to a latent embedding in the codebook or the acoustic machine learning model 103 may be configured to output a set of scores for each latent embedding in the codebook and the latent embedding having the highest score may be selected.

In a further example, the acoustic machine learning model 103 may parameterize a probability distribution over the codebook. The system 100 may be configured to select the latent embedding with the highest probability given the acoustic feature data 101 or the system 100 may be configured to sample from the probability distribution to select the latent embedding.

The system 100 is further configured to generate an output audio sample 104 based upon the selected first latent embedding. In some implementations, the output audio sample 104 is generated using a decoder machine learning model 105. The decoder machine learning model 105 may be any suitable machine learning model such as a generative machine learning model. The decoder machine learning model 105 may comprise one or more neural network layers such as Transformer blocks, residual blocks, feed-forward layers, attention layers, recurrent layers, LSTM layers, convolutional layers and upsampling layers amongst others. The generative machine learning model may be a generative neural network. For example, the generative neural network may be a decoder portion of a variational autoencoder, a diffusion-based model, or the generator portion of a generative adversarial network. The neural network layers may be arranged according to any appropriate architecture. For example, the decoder machine learning model 105 may be a decoder portion of a U-Net or other encoder/decoder architecture such as a Transformer. The decoder machine learning model 105 may generate output autoregressively or may generate the whole output together at once (non-autoregressively). Training of the decoder machine learning model 105 is described in more detail below.

In some implementations, the system 100 may also comprise one or more neural network layers (or other machine learning model) configured to process the selected latent embedding prior to processing by the decoder machine learning model 105. The additional neural network layers may be configured to carry out a de-quantization or a projection into a higher dimensional space or other appropriate operation. Alternatively, the decoder machine learning model 105 may process the selected latent embedding directly to generate the output audio sample 104.

The generated output audio sample 104 may be encoded in any appropriate form. For example, the output audio sample 104 may comprise digital samples of a waveform or the output audio sample 104 may comprise a time-frequency based representation that can be converted into a playable audio format. The audio format may be compressed or uncompressed and have any suitable sampling rate and bit-depth.

As discussed above, the system may be used for real-time generation of audio in a video game. At any suitable point when the video game is running, the video game may generate appropriate inputs and request audio from the audio generation system. The video game may then play the generated audio according to a suitable triggering criterion. Alternatively, the system may be used as part of the video game development process to generate a variety of audio samples. The generated audio samples may be stored and subsequently retrieved by a video game at runtime. The audio samples may be stored with appropriate metadata or labels to enable search and retrieval. The video game may retrieve the audio samples at any suitable point during runtime.

Figure 2:
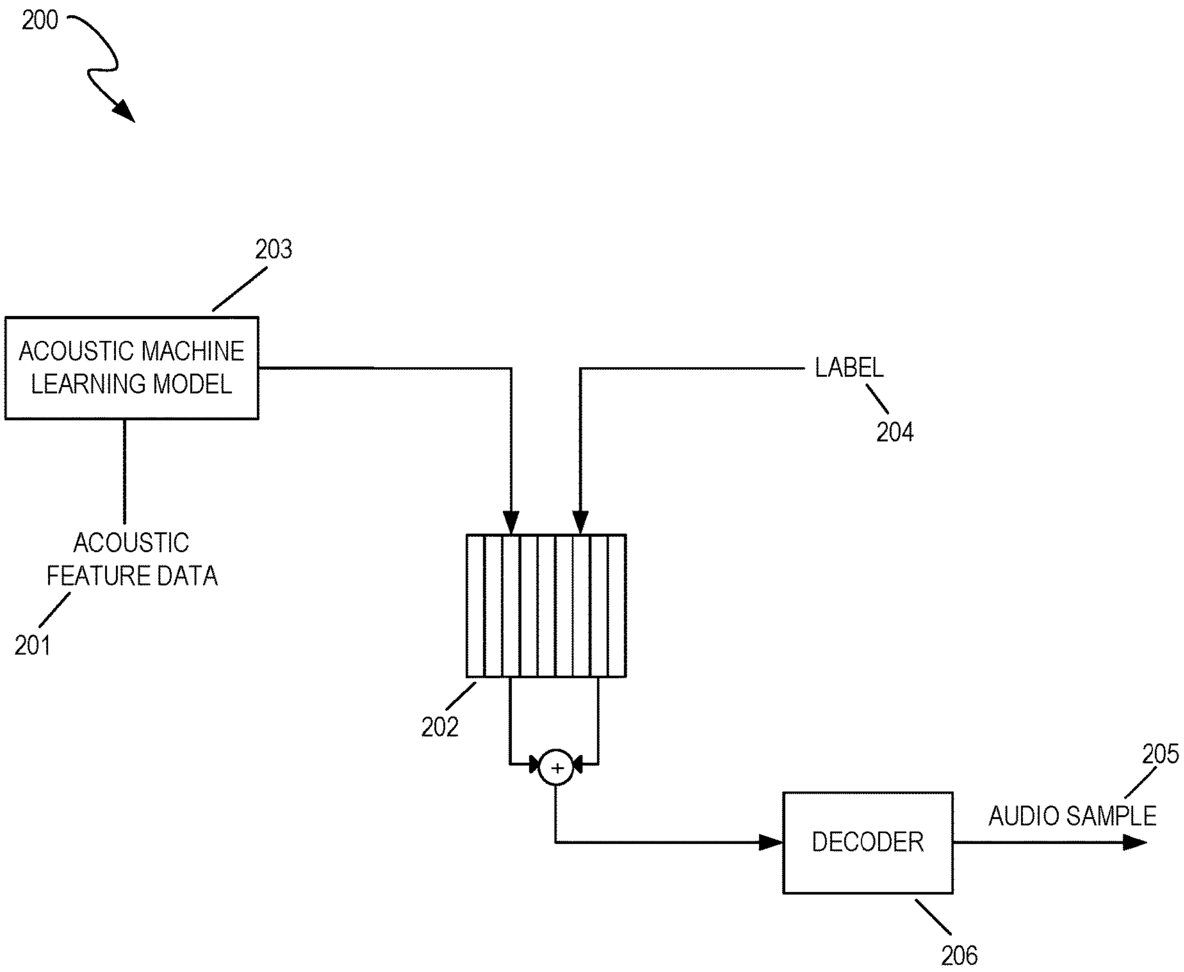
FIG. 2 is a schematic block diagram illustrating an example video game audio generation system to an embodiment.

FIG. 2 is a schematic block diagram of another example video game audio generation system 200. In general, the system 200 is configured to generate mixed or hybrid sounds. The system 200 is configured with an acoustic feature data pathway that is similar to the example system 100 of FIG. 1. In particular, the system 200 is configured to obtain acoustic feature data 201 that comprises a value for one or more audio characteristics. The system 200 is configured to select a first latent embedding from a codebook 202 of latent embeddings based upon processing the acoustic feature data 201 using an acoustic machine learning model 203 as described above.

The system 200 further comprises a second label-based pathway. In more detail, the system 200 is further configured to select a second latent embedding from the codebook 202 based upon a label 204. The label 204 may be indicative of a type of audio, entity or concept that is to be combined with the type of audio from the acoustic feature data 201. For example, the acoustic feature data 201 may correspond to an existing audio sample such as a lion's roar. The label 204 may indicate "a monster". The system 200 may combine the two concepts to generate a sound of a monster's roar.

The label 204 may be encoded in any suitable form. For example, the label may be a text string or the label may be in vector form such as a "one hot" encoding. The acceptable set of labels may be based upon the labels in a training dataset used to train the system. Training is described in more detail below. The label 204 may be provided to the system 200 by a user or by a video game in a request to generate audio as discussed above.

The system 200 may be configured to select the second latent embedding from the codebook 202 based upon the label 204 using any appropriate technique. For example, the system 200 may be configured to sample from a probability distribution over the codebook that is conditioned on the label 204.

In another example, a further machine learning model may be used to select the second latent embedding from the label in a similar manner to the selection of the first latent embedding using an acoustic machine learning model 203 described above.

The system 200 is configured to combine the first and second latent embeddings to generate a combined latent embedding. The combination may be based upon any suitable combination technique. For example, an average or a weighted sum of the first and second latent embeddings can be taken to generate the combined latent embedding.

The system 200 is configured to generate an output audio sample 205 based upon the combined latent embedding. In some implementations, the system 200 is configured to decode the combined latent embedding using a decoder machine learning model 206 to generate the output audio sample 205. The decoder machine learning model 206 may be configured as per the decoder machine learning model 105 in FIG. 1 above. By combining the first and second latent embeddings and generating an output audio sample from the combined latent embedding, the system 200 is capable of generating mixed or hybrid sounds.

In some implementations, the system 200 may also comprise one or more neural network layers (or other machine learning model) configured to process the first and second selected latent embeddings prior to combination, or to process the combined latent embedding prior to processing by the decoder machine learning model 205. The additional neural network layers may be configured to carry out a de-quantization or a projection into a higher dimensional space for example.

Figure 3:
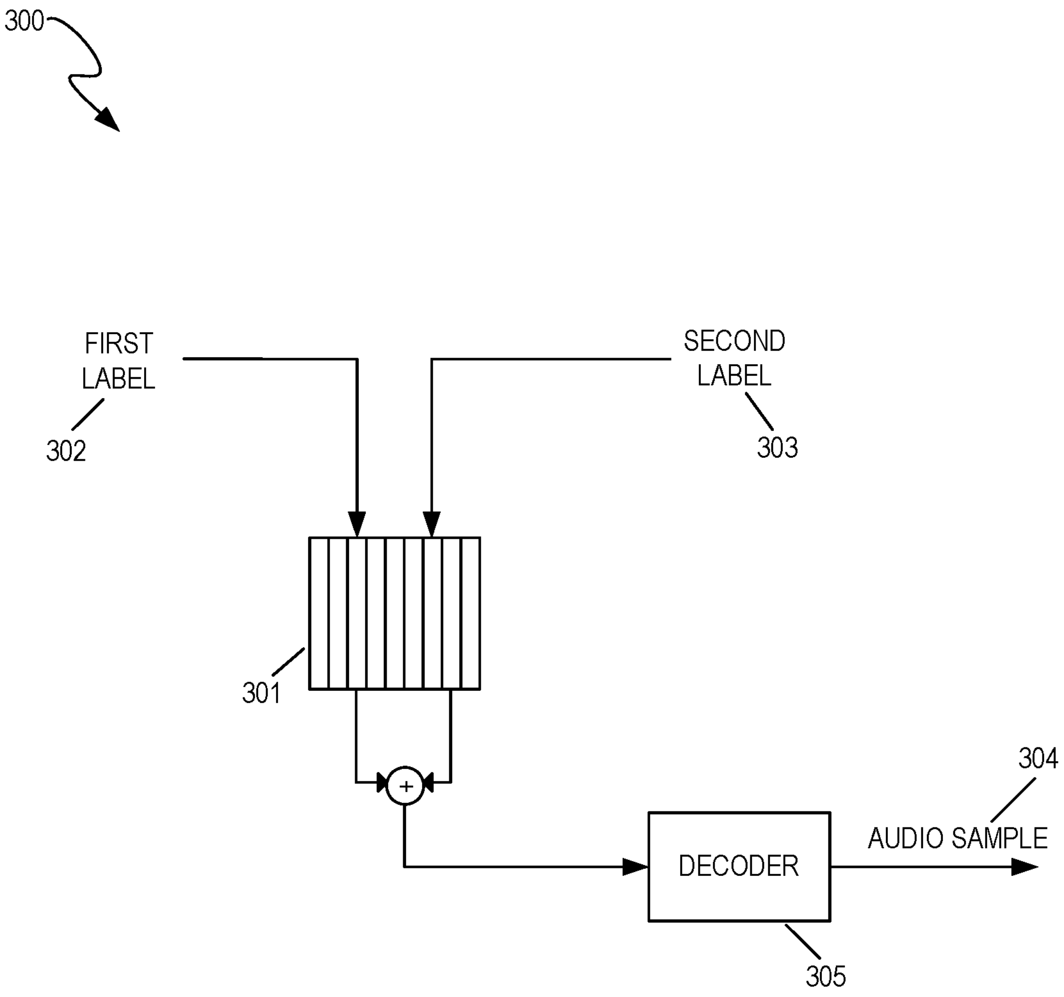
FIG. 3 is a schematic block diagram illustrating an example video game audio generation system according to an embodiment.

FIG. 3 is a schematic block diagram of a further example video game audio generation system 300. In general, the system 300 is another example of a system for generating mixed or hybrid sounds. The system 300 is configured to select a first latent embedding from a codebook 301 of latent embeddings based upon a first label 302. This may be carried out in the same manner as described above for the label-based pathway of the system 200 of FIG. 2. Instead of utilizing an acoustic pathway as per the system 200 of FIG. 2 however, the system 300 is configured to select a second latent embedding from the codebook 301 of latent embeddings based upon a second label 303.

The system 300 is configured to combine the first and second latent embeddings to generate a combined latent embedding. The combination may be carried out using any appropriate combination technique such as an average or weighted sum.

The system 300 is configured to generate an output audio sample 304 based upon the combined latent embedding. In some implementations, the system 300 is configured to decode the combined latent embedding using a decoder machine learning model 305. The decoder machine learning model 305 and the generation of an output audio sample 304 from a combined latent embedding may follow that as described above.

In some implementations, the system 300 may also comprise one or more neural network layers (or other machine learning model) configured to process the first and second selected latent embeddings prior to combination, or to process the combined latent embedding prior to processing by the decoder machine learning model 305. The additional neural network layers may be configured to carry out a de-quantization or a projection into a higher dimensional space for example.

In another embodiment, rather than selecting the first and second latent embeddings from two labels, the first and second latent embeddings may be selected on the basis of two different sets of acoustic feature data. Thus, a first latent embedding may be selected based upon processing first acoustic feature data using an acoustic machine learning model and the second latent embedding may be selected based upon processing second acoustic feature data using the acoustic machine learning model. The selection of the first and second latent embeddings may be carried out as described above with reference to FIG. 1. The selected first and second latent embeddings can then be combined and an audio sample generated from the combined latent embedding as described above. Therefore, it is possible to generate a mixed/hybrid sound from the audio characteristics of two existing sounds.

It will be appreciated that whilst the above describes the selection and combination of first and second latent embeddings, more than two latent embeddings can be selected and combined. The additional latent embeddings may be selected based upon any combination of additional sets of acoustic feature data or labels.

It will be appreciated that whilst the systems of FIGS. 1 to 3 have been described separately, the systems or elements of each system may be combined into one system as appropriate.

Figure 4:
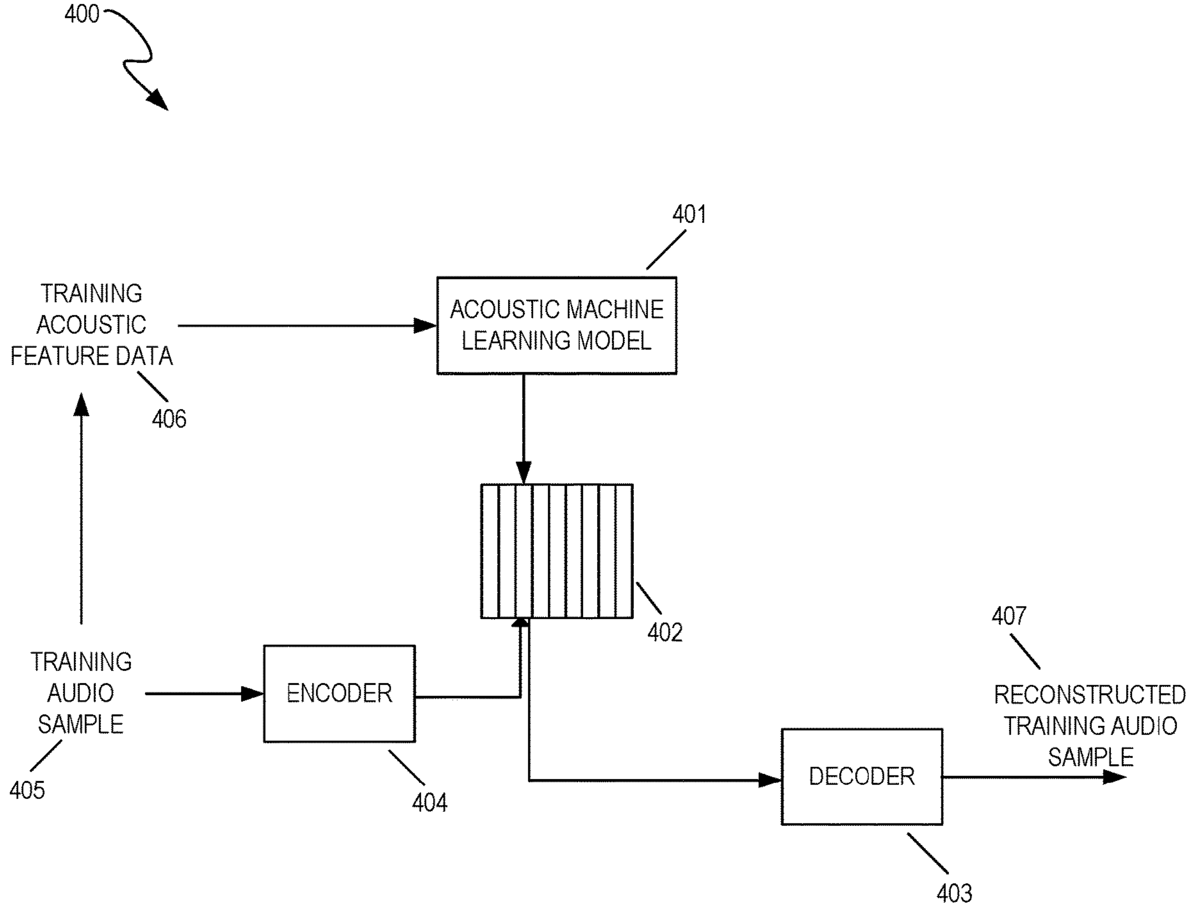
FIG. 4 is a schematic block diagram illustrating an example training system for training a video game audio generation system according to an embodiment.

FIG. 4 is a schematic block diagram of an exemplary training system 400. The training system 400 may be used to train the video game audio generation systems of FIGS. 1 to 3. The training system 400 may be part of the systems of FIGS. 1 to 3 or may be external to those systems. The training system 400 may be implemented by one or more processors located in one or more locations. The training system 400 may comprise a server, desktop computer, a mobile device such as a laptop, smartphone or tablet, or any other suitable computing apparatus. The training system 400 may be a distributed system or cloud-based system.

In more detail, the training system 400 is capable of training an acoustic machine learning model 401, a codebook 402, a decoder machine learning model 403, and an encoder machine learning model 404. In general, the system 400 is configured to train each component by processing a training audio sample 405 and its corresponding acoustic feature data 406 using the trainable components to generate a value of a loss function. The training system 400 is then configured to update the trainable components based upon the value of the loss function. This may include updating the parameters of each of the machine learning models and the latent embeddings of the codebook 402. Before training begins, the training system 400 may be configured to initialize the values of the parameters and the latent embeddings of the codebook 402. For example, these may be initialized randomly according to a particular range of values or distribution.

During training, the training system 400 may be configured to obtain a training audio sample 405 from a training dataset. The training dataset may comprise a plurality of existing audio samples and may also include corresponding labels for each audio sample. The training dataset may be stored on storage media local to the training system 400 or the training dataset may be retrieved over a suitable network connection.

The training system 400 may be configured to obtain acoustic feature data 406 corresponding to the training audio sample 405. The training system 400 itself may be configured to generate the acoustic feature data 406 from the training audio sample 405 or alternatively, the training dataset may also include the acoustic feature data for each training audio sample or an external system may be used to generate the acoustic feature data. As discussed above, the acoustic feature data 406 comprises a value for one or more audio characteristics. The acoustic feature data 406 is generally a higher-level representation than the training audio sample 405. For example, the training audio sample 405 may be an encoding of a raw sound recording whereas the acoustic feature data 406 may correspond to characteristics/properties that are descriptive of the sound.

The training system 400 may be further configured to generate a first training latent embedding based upon processing the training acoustic feature data 406 using the (current parameters of the) acoustic machine learning model 401. The training system 400 may be configured to generate the first training latent embedding by selecting from the (current) codebook 402 of latent embeddings based upon the processing of the training acoustic feature data 406 using the acoustic machine learning model 401. The selection from the codebook 402 may be carried out using any suitable technique as described above. For example, the acoustic machine learning model 401 may generate an encoding and a nearest neighbour latent embedding in the codebook 402 may be selected, or the acoustic machine learning model 401 may generate an index of the codebook 402 corresponding to the selected latent embedding, or the acoustic machine learning model 401 may generate a set of scores for each latent embedding of the codebook 402 and select the latent embedding with the highest score, or the acoustic machine learning model 401 may provide a probability distribution over the codebook 402 and the latent embedding with the highest probability selected or the probability distribution is sampled to select the latent embedding from the codebook 402.

The training system 400 may be further configured to generate a second training latent embedding based upon processing the training audio sample 405 using the encoder machine learning model 404. The encoder machine learning model 404 may be any appropriate machine learning model. Generally, the encoder machine learning model 404 has an architecture that mirrors the architecture of the decoder machine learning model 403. The encoder machine learning model 404 may comprise one or more neural network layers such as Transformer blocks, residual blocks, feed-forward layers, attention layers, recurrent layers, LSTM layers, convolutional layers and downsampling layers amongst others. The neural network layers may be arranged according to any appropriate architecture. For example, the encoder machine learning model 404 may be an encoder portion of a U-Net or other encoder/decoder architecture such as a Transformer or variational autoencoder.

The training system 400 may be configured to generate the second training latent embedding by selecting from the (current) codebook of latent embeddings based upon the processing of the training audio sample 405 using the encoder machine learning model 404. The selection of the second training latent embedding may be carried out using any appropriate technique. For example, any of the methods described for selecting the first training latent embedding may be used by substituting the output of the acoustic machine learning model 401 for the output of encoder machine learning model 404.

Where a label exists for the training audio sample 405, the selection of the second training latent embedding may be further based upon the label. Selection of a latent embedding from the codebook based upon a label may be carried out as described above with reference to FIGS. 2 and 3. For example, a probability distribution over the codebook 402 conditioned on the label may be sampled from to select a latent embedding. The probability distribution may be based upon the output of the encoder machine learning model 404.

The training system 400 may be configured to compare the first and second training latent embeddings to determine an acoustic loss term of a loss function. In general, as the training acoustic feature data 406 is derived from the training audio sample 405, the same or very similar latent embeddings should be generated/selected. The acoustic loss term attempts to adjust the parameters of the machine learning models to enable that to occur. After training, it may be possible to obtain the latent embedding for a recorded sound using only the acoustic feature data which is generally of lower dimensionality and has lower storage/memory requirements than the audio sample.

The acoustic loss term may be based upon any suitable comparison or distance metric. For example, a mean-squared error or cross-entropy error may be used. Alternatively, a cosine distance may be used for the comparison or a KL-divergence in the case of two probability distributions. The comparison may also be based upon a log-likelihood.

The training system 400 may be further configured to generate a reconstruction 407 of the training audio sample. The training system 400 may be configured to process the second training latent embedding (which was generated/selected from processing the training audio sample 405 using the encoder machine learning model 404) using the decoder machine learning model 403 to generate the reconstructed training audio sample 407. In addition, or alternatively, the training system 400 may be configured to process the first training latent embedding (which was generated/selected from processing the training acoustic feature data 406 using the acoustic machine learning model 401) using the decoder machine learning model 403 to generate an additional/alternative reconstructed training audio sample. The decoder machine learning model 403 may generate a reconstruction as per the generation of an audio sample described above with references to FIGS. 1 to 3.

The training system 400 may be configured to compare each respective reconstructed training audio sample 407 with the original training audio sample 401. The loss function may further comprise a reconstruction loss term based upon the comparison. The reconstruction loss term attempts to adjust the parameters of the models and/or codebook to ensure that the latent embeddings capture salient information from the inputs and that realistic audio can be generated from the latent embeddings. As with the acoustic loss term, the comparison for the reconstruction loss term may be based upon any suitable comparison or distance metric, such as a mean-squared error, cross-entropy error, cosine distance, KL-divergence, or the log-likelihood of the training audio sample given the reconstructed training audio sample amongst others.

In some implementations, the output of the encoder machine learning model 404 may be further processed prior to selection of the second training latent embedding. For example, the encoding may undergo a quantization operation (using a k-means technique for example) or a dimensionality reduction operation. The selection of the second training latent embedding may then be based upon the output of this further operation. The training system 400 may also comprise one or more neural network layers (or other machine learning model) configured to process the selected training latent embedding prior to processing by the decoder machine learning model 403. The additional neural network layers may be configured to carry out a de-quantization or a projection into a higher dimensional space or an inverse operation of the processing carried out on the output of the encoder machine learning model 404.

The loss function may further comprise a quantization loss term. The quantization loss term may be based upon a comparison between the second training latent embedding from the current training iteration and the second training latent embedding from a previous training iteration. The quantization loss term may also be based upon a comparison between the training audio sample 405 and the output of quantization. As per the above, the comparison may be based upon any suitable comparison technique.

The loss function may also comprise additional terms as appropriate. For example, the loss function may comprise a latent embedding loss term. The latent embedding loss term may be based upon a comparison between the output of the encoder machine learning model 404 and the selected second training latent embedding. In addition, or alternatively, the latent embedding loss term may be based upon a comparison between the output of the acoustic machine learning model 401 and the selected first training latent embedding. The latent embedding loss term may encourage the models and the codebook to be consistent, particularly where a nearest neighbour selection or similar is used to select from the codebook.

Each of the loss function terms may have an associated weighting and the value of the loss function may be computed using a weighted sum of each of the terms. The parameters of each of the models and latent embeddings of the codebook may be adjusted based upon the value of the loss function using any appropriate optimization method. For example, each trainable component may be updated using backpropagation and stochastic gradient descent. Where certain operations are non-differentiable, the gradient may simply be copied over during backpropagation or another gradient estimation technique may be used.

The training system 400 may be configured to process additional training audio samples from the training dataset and may be configured to perform multiple passes or iterations over the training dataset until a suitable stopping criterion is reached. For example, a threshold number of training iterations have been performed or the loss function value has sufficiently converged. In some implementations, the loss value may be accumulated over a batch of training audio samples prior to updating.

After training has been completed, the parameters of the models and codebook may be transmitted to a system that is to carry out the audio generation process or may be stored for later use. The encoder machine learning model 404 is generally not required for generating audio and may be discarded.

Figure 5:
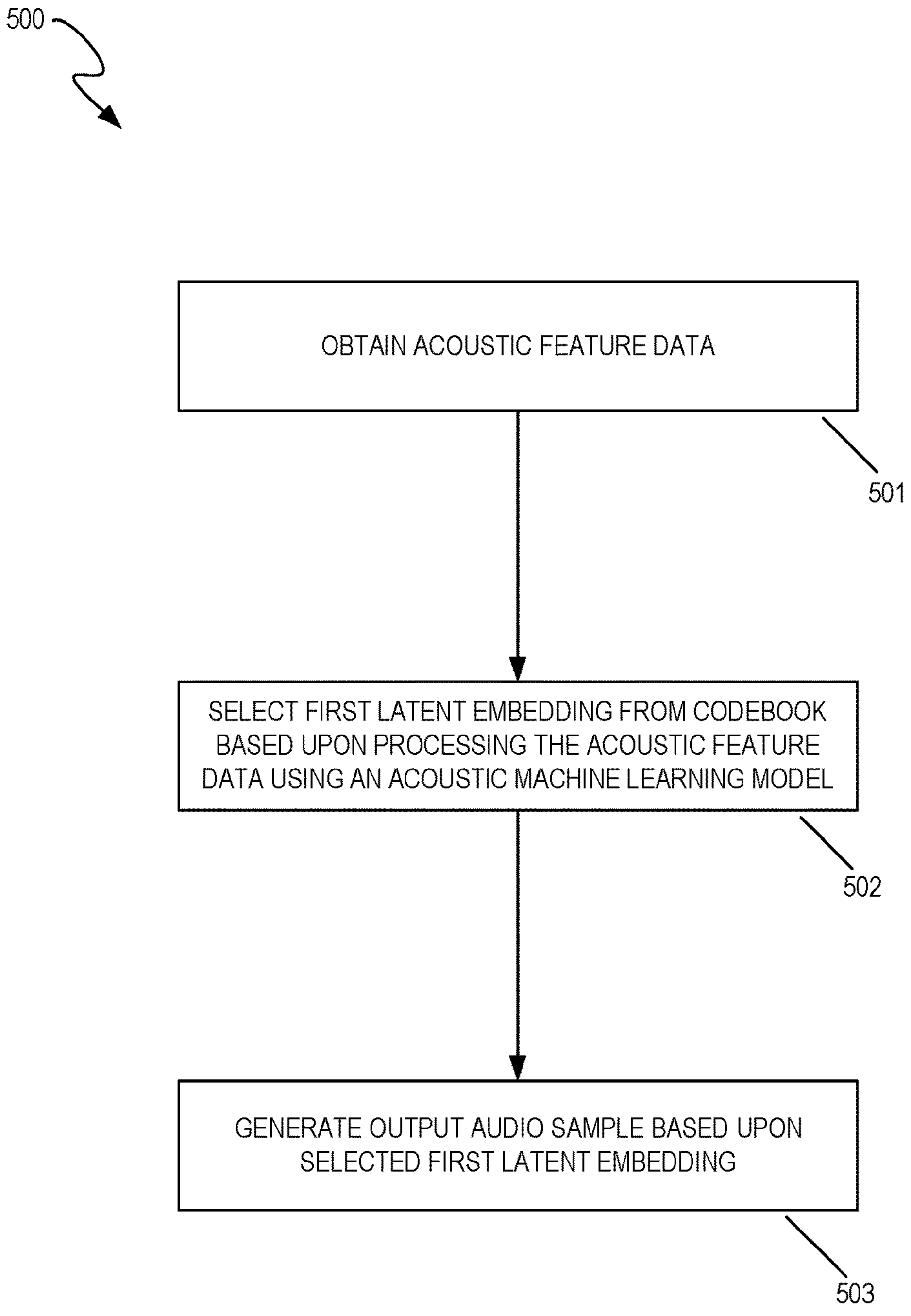
FIG. 5 is a flowchart illustrating an example method for generating audio for a video game according to an embodiment.

FIG. 5 is a flow diagram illustrating an example method 500 for generating audio for a video game. The processing shown in FIG. 5 may be carried out by any of the systems described above.

At step 501, acoustic feature data is obtained by one or more processors. The acoustic feature data comprises a value for one or more audio characteristics. The acoustic feature data may be derived from an existing audio sample.

As discussed above, the acoustic feature data is generally a higher-level representation than a recorded audio sample. For example, the acoustic feature data may correspond to characteristics/properties that are descriptive of the sound and may include characteristics/properties of sounds that can be manipulated by a synthesizer, such as ADSR (Attack-Decay-Sustain-Release) envelope, distortion, and modulation amongst others. The acoustic feature data may be based upon MIDI audio data. In some implementations, the acoustic feature data comprises at least one value modified from the values corresponding to an existing audio sample. The modified value is based upon a desired changed in the corresponding acoustic characteristic of the existing audio sample.

At step 502, a first latent embedding from a codebook of latent embeddings is selected by one or more of the processors based upon processing the acoustic feature data using an acoustic machine learning model. As discussed above, the acoustic machine learning model may be any type of machine learning model as deemed appropriate by a person skilled in the art. For example, the acoustic machine learning model may comprise one or more neural network layers. As discussed above, the selection from the codebook may be carried out using any suitable technique. For example, the acoustic machine learning model may generate an encoding and a nearest neighbour latent embedding in the codebook may be selected, or the acoustic machine learning model may generate an index of the codebook corresponding to the selected latent embedding, or the acoustic machine learning model may generate a set of scores for each latent embedding of the codebook and select the latent embedding with the highest score, or the acoustic machine learning model may provide a probability distribution over the codebook and the latent embedding with the highest probability selected or the probability distribution is sampled to select the latent embedding from the codebook.

At step 503, an output audio sample is generated by one or more of the processors based upon the selected first latent embedding. In some implementations, generating the output audio sample comprises decoding by one or more of the processors the first latent embedding using a decoder machine learning model to generate the output audio sample. As discussed above, the decoder machine learning model may be any suitable machine learning model such as a generative machine learning model. The decoder machine learning model may comprise one or more neural network layers such as Transformer blocks, residual blocks, feed-forward layers, attention layers, recurrent layers, LSTM layers, convolutional layers and upsampling layers amongst others. The generated output audio sample may be encoded in any appropriate form. For example, the output audio sample may comprise digital samples of a waveform or the output audio sample 104 may comprise a time-frequency based representation that can be converted into a playable audio format. The audio format may be compressed or uncompressed and have any suitable sampling rate and bit-depth.

The method 500 may be carried out in response to a request to generate audio from a video game. At any suitable point when the video game is running, the video game may generate appropriate inputs and request the generation of audio. The video game may then play the generated audio according to a suitable triggering criterion.

Figure 6:
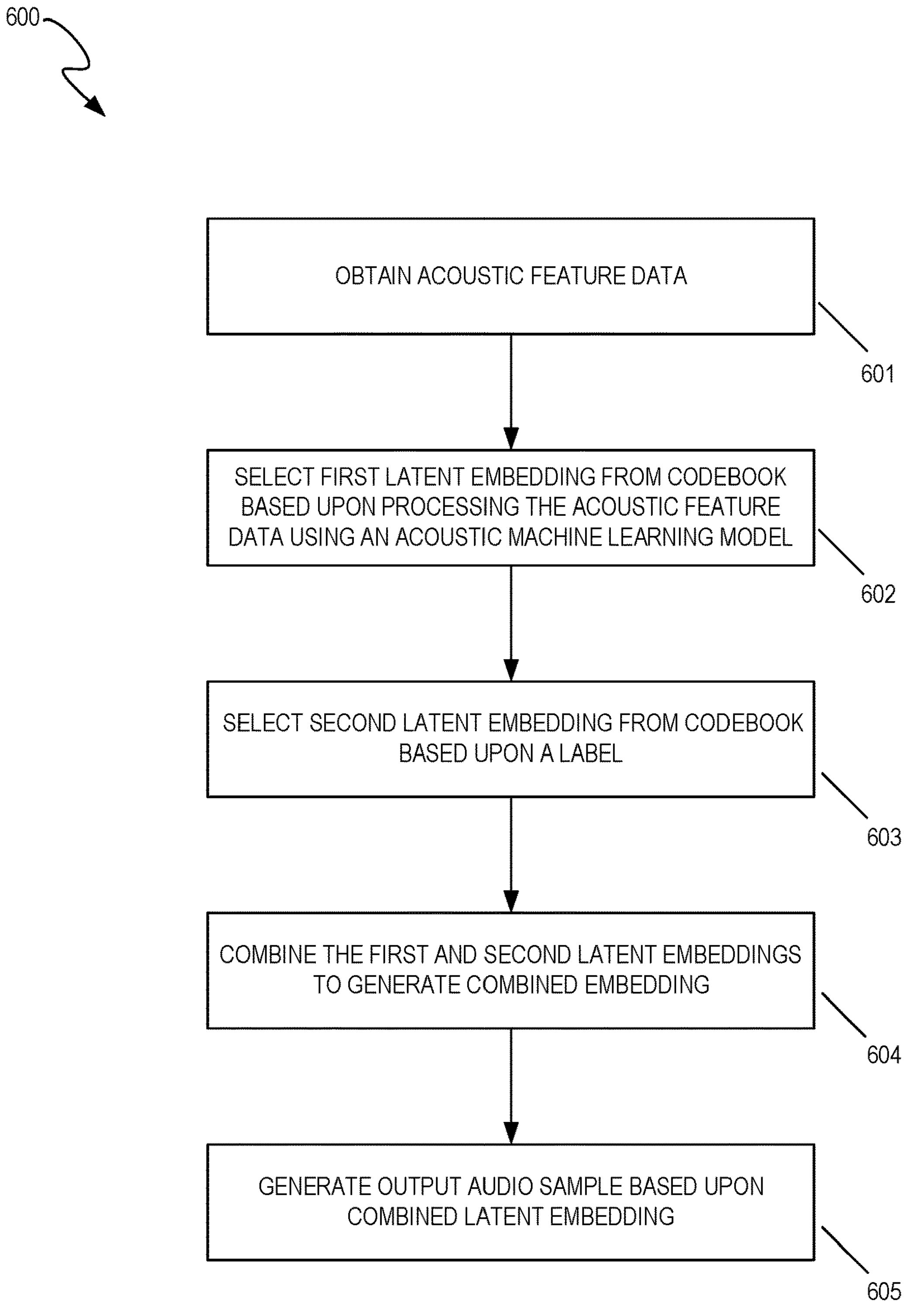
FIG. 6 is a flowchart illustrating a second example method for generating audio for a video game according to an embodiment.

FIG. 6 is a flow diagram illustrating another example method 600 for generating audio for a video game. In general, the method 600 may be used to generate mixed or hybrid sounds. The processing shown in FIG. 6 may be carried out by the system of FIG. 2.

Steps 601 and 602 are the same as steps 501 and 502 of FIG. 5. That is, at step 601, acoustic feature data is obtained by one or more processors and at step 602, a first latent embedding from a codebook of latent embeddings is selected by one or more of the processors based upon processing the acoustic feature data using an acoustic machine learning model. Both steps 601 and 602 may be implemented as described above.

At step 603, a second latent embedding is selected from the codebook by one or more of the processors based upon a label. As discussed above, the label may be indicative of a type of audio, entity or concept that is to be combined with the type of audio from the acoustic feature data. The label may be encoded in any suitable form. For example, the label may be a text string or the label may be in vector form such as a "one hot" encoding. The acceptable set of labels may be based upon the labels in a training dataset used to train the system. The label may be provided by a user or by a video game in a request to generate audio.

As discussed above, in some implementations, selecting the second latent embedding comprises sampling a probability distribution over the codebook conditioned on the label by one or more of the processors. Alternatively, any other suitable selection method may be used.

At step 604, the first and second latent embeddings are combined by one or more of the processors to generate a combined latent embedding. As discussed above, the combination may be based upon any suitable combination technique. For example, an average or a weighted sum of the first and second latent embeddings can be taken to generate the combined latent embedding.

At step 605, the combined latent embedding is decoded by one or more of the processors to generate an output audio sample. In some implementations, a decoder machine learning model is used to decode the combined latent embedding to generate the output audio sample. The decoding may be carried out in the same manner as step 503 of FIG. 5 and as discussed above.

Figure 7:
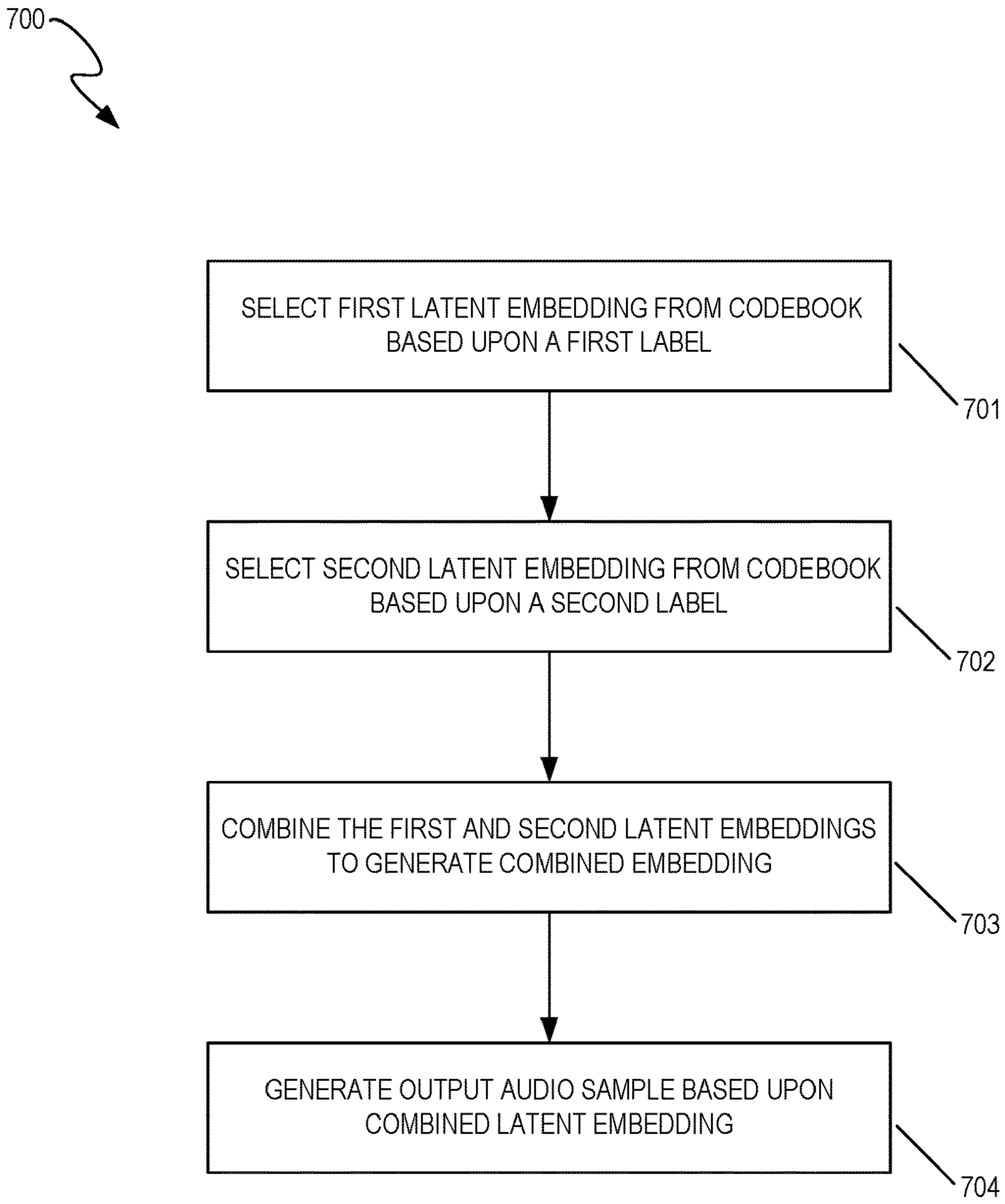
FIG. 7 is a flowchart illustrating a third example method for generating audio for a video game according to an embodiment.

FIG. 7 is a flow diagram illustrating a further example method 700 for generating audio for a video game. In general, the method 700 is another example of method for generating mixed or hybrid sounds. The processing shown in FIG. 7 may be carried out by the system of FIG. 3.

At step 701, a first latent embedding is selected by one or more processors from a codebook of latent embeddings based upon a first label. This step is the same as step 603 and may be carried out in the same manner as described above.

At step 702, a second latent embedding is selected by one or more of the processors from the codebook of latent embeddings based upon a second label. The selection may be carried out in the same manner as step 701 but using a different label.

The remaining steps 703 and 704 are the same as steps 604 and 605 above. That is, at step 703, the first and second latent embeddings are combined by one or more of the processors to generate a combined latent embedding. The combination may be carried out in the same manner as step 604 and as described above. At step 704, the combined latent embedding is decoded by one or more of the processors to generate an output audio sample. In some implementations, the decoding is performed by a decoder machine learning model and the decoding may be carried out in the same manner as step 605 and as described above.

Figure 8:
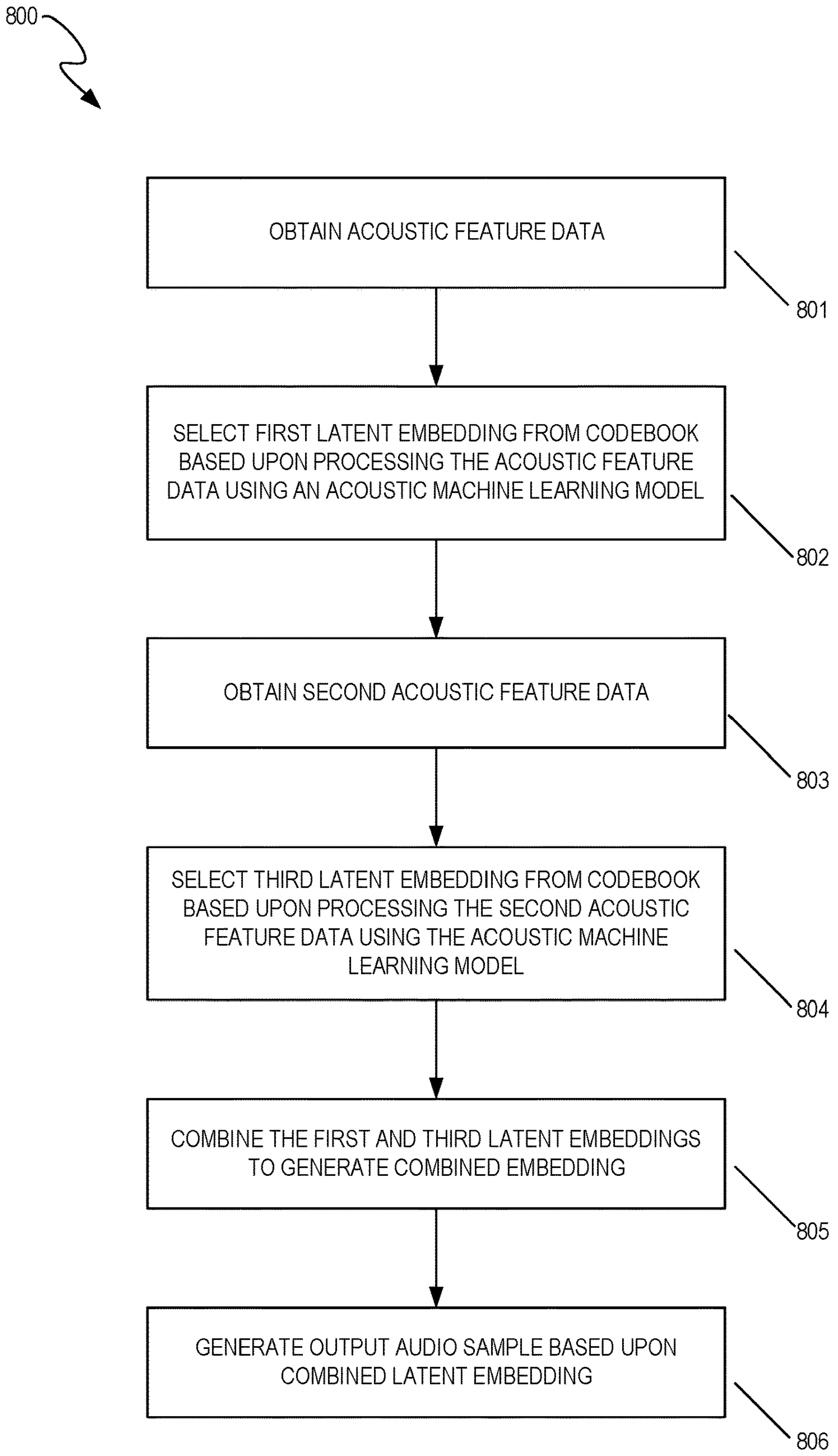
FIG. 8 is a flowchart illustrating a fourth example method for generating audio for a video game according to an embodiment.

FIG. 8 is a flow diagram illustrating an example method 800 for generating audio for a video game. In general, the method 800 may be used to generate mixed or hybrid sounds.

Steps 801 and 802 are the same as steps 501 and 502 of FIG. 5. That is, at step 801, acoustic feature data is obtained by one or more processors and at step 802, a first latent embedding from a codebook of latent embeddings is selected by one or more of the processors based upon processing the acoustic feature data using an acoustic machine learning model. Both steps 801 and 802 may be implemented as described above.

Steps 803 and 804 then repeat steps 801 and 802 but for a different set of acoustic feature data. That is, at step 803, a second set of acoustic feature data is obtained by one or more of the processors. The second set of acoustic feature data may be generated from a different existing audio sample to that obtained in step 801 or the second set of acoustic feature data may be modified from the acoustic feature data obtained in step 801.

At step 804, a latent embedding (which will be referred to as a third latent embedding) from the codebook of latent embeddings is selected by one or more of the processors based upon processing the second set of acoustic feature data using the acoustic machine learning model. This can be carried out in the same manner as the selection of the first latent embedding.

At step 805, the first and third latent embeddings are combined by one or more of the processors to generate a combined latent embedding. This may be carried out in the same manner as steps 604 and 703 and as described above. At step 806, an output audio sample is generated by one or more of the processors based upon the combined latent embedding. This may be carried out in the same manner as steps 605 and 704 and as described above.

Whilst the methods of FIGS. 5 to 8 are shown separately, it will be appreciated that individual steps of each method may be combined as appropriate. Additionally, whilst certain steps are shown in a particular order, it is not intended for such an ordering to be limiting and the steps may be carried out in different order where feasible.

Figure 9:
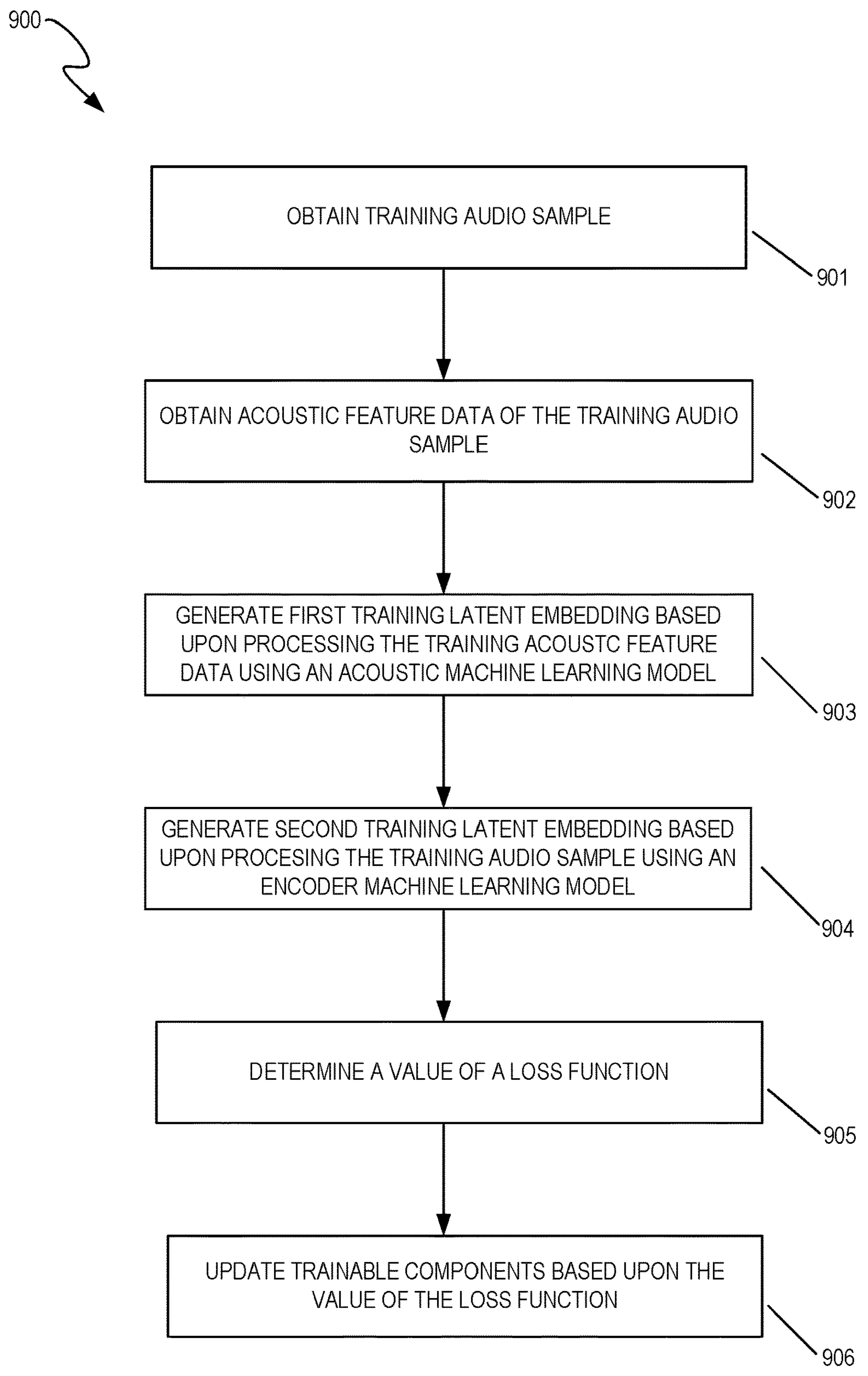
FIG. 9 is a flowchart illustrating an example method for training a video game audio generation system according to an embodiment.

FIG. 9 is a flow diagram illustrating an example method 900 for training a video game audio generation system. The processing shown in FIG. 9 may be carried out by the system of FIG. 4.

At step 901, a training audio sample is obtained by one or more processors. As discussed above, the training audio sample may be obtained from a training dataset. The training dataset may comprise a plurality of existing audio samples and may also include corresponding labels for each audio sample.

At step 902, acoustic feature data comprising a value for one or more audio characteristics of the training audio sample is obtained by one or more of the processors. The acoustic feature data has the same form as described above.

At step 903, a first training latent embedding is generated by one or more of the processors based upon processing the training acoustic feature data using an acoustic machine learning model. In some implementations, the first training latent embedding is selected from a codebook of latent embeddings based upon the processing of the training acoustic feature data using the acoustic machine learning model. The acoustic machine learning model, its processing and the selection of the first latent embedding may be implemented as described above.

At step 904, a second training latent embedding is generated by one or more of the processors based upon processing the training audio sample using an encoder machine learning model. In some implementations, the second training latent embedding is selected from the codebook of latent embeddings based upon the processing of the training audio sample using the encoder machine learning model. The encoder machine learning model, its processing and the selection of the second latent embedding may be implemented as described above.

At step 905, a value of a loss function is determined by the one or more of the processors. The loss function may comprise one or more terms. In some implementations, the loss function comprises an acoustic loss term that is based upon a comparison between the first and second training latent embeddings. As described above, in general, as the training acoustic feature data is derived from the training audio sample, the same or very similar latent embeddings should be generated or selected. The acoustic loss term attempts to adjust the parameters of the machine learning models to enable that to occur. The acoustic loss term may be based upon any suitable comparison or distance metric as discussed above.

In some implementations, the loss function comprises a reconstruction loss term. In order to determine the reconstruction loss term, a reconstructed training audio sample may be generated using a decoder machine learning model. As described above, a reconstructed training audio sample may be generated by processing either of the first or second training latent embeddings using the decoder machine learning model. In some implementations, a respective reconstructed training audio sample is generated from each of the first and second training latent embeddings. The reconstruction loss term may be based upon a comparison of each respective reconstructed training audio sample and the original training audio sample. The reconstruction loss term may be based upon any suitable comparison or distance metric as discussed above.

In some implementations, the loss function may comprise a quantization loss term. As discussed above, the quantization loss term may be based upon a comparison between the second training latent embedding from the current training iteration and the second training latent embedding from a previous training iteration. The quantization loss term may also be based upon a comparison between the training audio sample and the output of quantization where appropriate. The comparison may be based upon any suitable comparison technique as discussed above.

In some implementations, the loss function may comprise a latent embedding loss term. As discussed above, the latent embedding loss term may be based upon a comparison between the output of the encoding machine learning model and the selected second training latent embedding. In addition, or alternatively, the latent embedding loss term may be based upon a comparison between the output of the acoustic machine learning model and the selected first training latent embedding. The latent embedding loss term may encourage the models and the codebook to be consistent, particularly where a nearest neighbour selection or similar is used to select from the codebook. The latent embedding loss term may be based upon any suitable comparison or distance metric as discussed above.

Where the loss function comprises multiple terms, each of the loss function terms may have an associated weighting and the value of the loss function may be computed using a weighted sum of each of the terms as discussed above.

At step 906, the trainable components are adjusted based upon the value of the loss function. The trainable components may comprise the parameters of each of the machine learning models and the latent embeddings of the codebook. As discussed above, the updating may be based upon any appropriate optimization method such as backpropagation and stochastic gradient descent.

The processing of FIG. 9 may be repeated for additional training audio samples from the training dataset and for multiple passes or iterations over the training dataset until a suitable stopping criterion is reached. For example, a threshold number of training iterations have been performed or the loss function value has sufficiently converged. In some implementations, the loss value may be accumulated over a batch of training audio samples prior to updating.

Whilst certain steps in FIG. 9 are shown in a particular order, it is not intended for an ordering to be limiting and the steps may be carried out in different order where appropriate.

Figure 10:
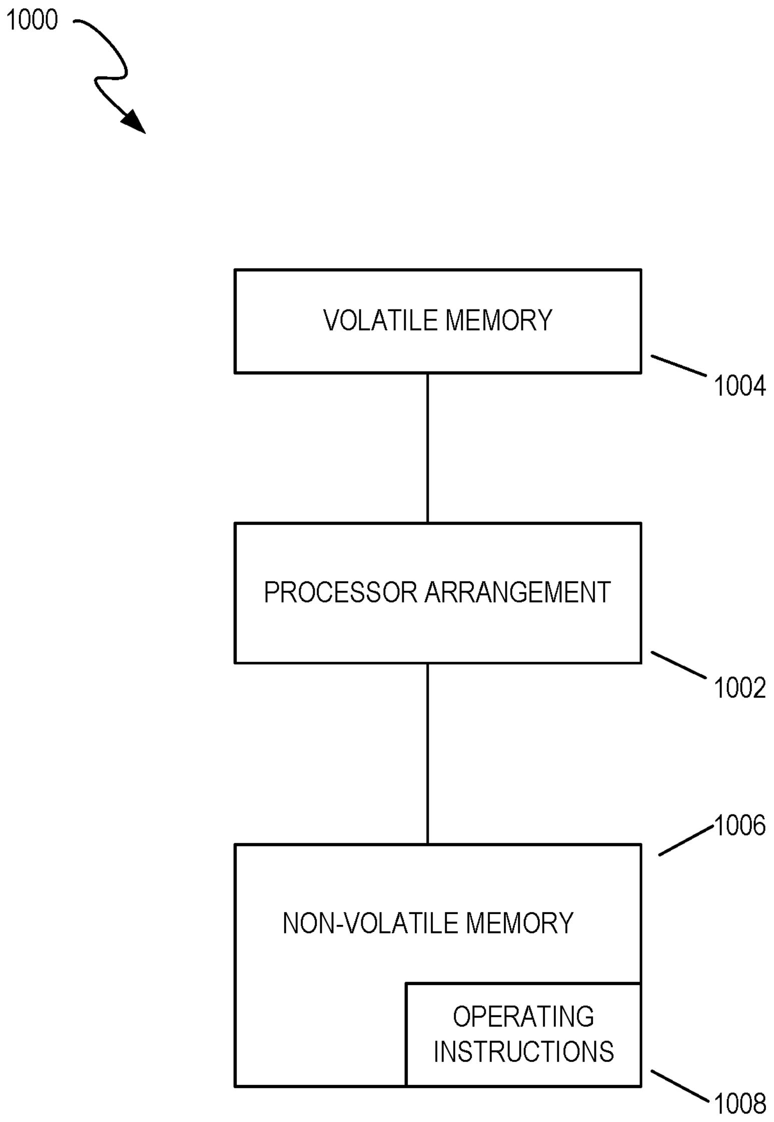
FIG. 10 shows a schematic example of a system/apparatus for performing any of the methods described herein.

FIG. 10 shows a schematic example of a system/apparatus 1000 for performing any of the methods described herein. The system/apparatus shown is an example of a computing device. It will be appreciated by a person skilled in the art that other types of computing devices/systems may alternatively be used to implement the methods described herein, such as a distributed computing system.

The apparatus (or system) 1000 comprises one or more processors 1002. The one or more processors control operation of other components of the system/apparatus 1000. The one or more processors 1002 may, for example, comprise a general purpose processor. The one or more processors 1002 may be a single core device or a multiple core device. The one or more processors 1002 may comprise a central processing unit (CPU) or a graphical processing unit (GPU). Alternatively, the one or more processors 1002 may comprise specialised processing hardware, for instance a RISC processor or programmable hardware with embedded firmware. Multiple processors may be included.

The system/apparatus comprises a working or volatile memory 1004. The one or more processors may access the volatile memory 1004 in order to process data and may control the storage of data in memory. The volatile memory 1004 may comprise RAM of any type, for example Static RAM (SRAM), Dynamic RAM (DRAM), or it may comprise Flash memory, such as an SD-Card.

The system/apparatus comprises a non-volatile memory 1006. The non-volatile memory 1006 stores a set of operation instructions 1008 for controlling the operation of the processors 1002 in the form of computer readable instructions. The non-volatile memory 1006 may be a memory of any kind such as a Read Only Memory (ROM), a Flash memory or a magnetic drive memory.

The one or more processors 1002 are configured to execute operating instructions 1008 to cause the system/apparatus to perform any of the methods described herein. The operating instructions 1008 may comprise code (i.e. drivers) relating to the hardware components of the system/apparatus 1000, as well as code relating to the basic operation of the system/apparatus 1000. Generally speaking, the one or more processors 1002 execute one or more instructions of the operating instructions 1008, which are stored permanently or semi-permanently in the non-volatile memory 1006, using the volatile memory 1004 to temporarily store data generated during execution of said operating instructions 1008.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating audio for a video game, the method implemented by one or more processors, the method comprising:

obtaining, by one or more of the processors, acoustic feature data comprising a value for one or more audio characteristics;

wherein the acoustic feature data is based upon MIDI audio data;

wherein the acoustic feature data comprises at least one value modified from the values corresponding to an existing audio sample, the modified value based upon a desired change in the corresponding acoustic characteristic of the existing audio sample;

selecting, by one or more of the processors, a first latent embedding from a codebook of latent embeddings based upon processing the acoustic feature data using an acoustic machine learning model;

wherein the first latent embedding is a representation of the acoustic feature data; and generating, by one or more of the processors, an output audio sample based upon the selected first latent embedding using a decoder machine learning model.

2. The method of claim 1, wherein the acoustic machine learning model comprises one or more neural network layers.

3. The method of claim 1, wherein the method further comprises:

selecting, by one or more of the processors, a second latent embedding from the codebook based upon a label; and wherein generating, by one or more of the processors, an output audio sample based upon the selected first latent embedding comprises:

combining, by one or more of the processors, the first latent embedding and the second latent embedding to generate a combined latent embedding; and decoding, by one or more of the processors, the combined latent embedding to generate the output audio sample.

4. The method of claim 3, wherein selecting, by one or more of the processors, a second latent embedding from the codebook based upon a label comprises:

sampling, by one or more of the processors, a probability distribution over the codebook conditioned on the label.

5. The method of claim 1, wherein the method further comprises:

obtaining, by one or more of the processors, second acoustic feature data;

selecting, by one or more of the processors, a third latent embedding from the codebook based upon processing the second acoustic feature data using the acoustic machine learning model; and wherein generating, by one or more of the processors, an output audio sample based upon the selected first latent embedding comprises:

combining, by one or more of the processors, the first latent embedding and the third latent embedding to generate a combined latent embedding; and decoding, by one or more of the processors, the combined latent embedding to generate the output audio sample.

6. The method of claim 1, wherein the acoustic machine learning model has been trained using a training method comprising:

obtaining, by one or more of the processors, a training audio sample;

obtaining, by one or more of the processors, training acoustic feature data comprising a value for one or more audio characteristics of the training audio sample;

generating, by one or more of the processors, a first training latent embedding based upon processing the training acoustic feature data using the acoustic machine learning model;

generating, by one or more of the processors, a second training latent embedding based upon processing the training audio sample using an encoder machine learning model;

determining, by one or more of the processors, a value of a loss function, wherein the loss function comprises an acoustic loss term based upon a comparison between the first and second training latent embeddings; and updating, by one or more of the processors, the acoustic machine learning model based upon the value of the loss function.

7. The method of claim 6, wherein the first training latent embedding is selected from the codebook of latent embeddings based upon processing of the training acoustic feature data using the acoustic machine learning model; and wherein the second training latent embedding is selected from the codebook of latent embeddings based upon the processing of the training audio sample using the encoder machine learning model.

8. The method of claim 7, wherein the training method further comprises:

updating, by one or more of the processors, the codebook of latent embeddings based upon the value of the loss function.

9. The method of claim 6, wherein the training method further comprises:

generating, by one or more of the processors, a reconstruction of the training audio sample based upon processing the second training latent embedding using the decoder machine learning model; and wherein the loss function further comprises a reconstruction loss term based upon a comparison between the training audio sample and the reconstruction of the training audio sample; and updating, by one or more of the processors, the decoder machine learning model based upon the value of the loss function.

10. The method of claim 6, wherein the training method further comprises:

updating, by one or more of the processors, the encoder machine learning model based upon the value of the loss function.

11. The method of claim 6, wherein the training method further comprises:

quantizing, by one or more of the processors, the output of the processing by the encoder machine learning model; and wherein generating the second training latent embedding is based upon the quantized output.

12. The method of claim 6, wherein the loss function further comprises a quantization loss term.

13. The method of claim 12, wherein the quantization loss term is based upon a comparison between the second training latent embedding from a current training iteration and the second training latent embedding from a previous training iteration.

14. One or more non-transitory computer-readable storage media comprising instructions which, when executed by one or more processors, cause the one or more processors to carry out a method comprising:

obtaining, by one or more of the processors, acoustic feature data comprising a value for one or more audio characteristics;

wherein the acoustic feature data is based upon MIDI audio data;

wherein the acoustic feature data comprises at least one value modified from the values corresponding to an existing audio sample, the modified value based upon a desired change in the corresponding acoustic characteristic of the existing audio sample;

selecting, by one or more of the processors, a first latent embedding from a codebook of latent embeddings based upon processing the acoustic feature data using an acoustic machine learning model;

wherein the first latent embedding is a representation of the acoustic feature data; and generating, by one or more of the processors, an output audio sample based upon the selected first latent embedding using a decoder machine learning model.

15. A system comprising:

one or more processors; and one or more computer readable storage media comprising processor readable instructions to cause one or more of the processors to carry out a method comprising:

obtaining, by one or more of the processors, acoustic feature data comprising a value for one or more audio characteristics;

wherein the acoustic feature data is based upon MIDI audio data;

wherein the acoustic feature data comprises at least one value modified from the values corresponding to an existing audio sample, the modified value based upon a desired change in the corresponding acoustic characteristic of the existing audio sample;

selecting, by one or more of the processors, a first latent embedding from a codebook of latent embeddings based upon processing the acoustic feature data using an acoustic machine learning model;

wherein the first latent embedding is a representation of the acoustic feature data; and generating, by one or more of the processors, an output audio sample based upon the selected first latent embedding using a decoder machine learning model.

16. The system of claim 15, wherein the acoustic machine learning model comprises one or more neural network layers.

17. The system of claim 15, wherein the instructions further cause one or more of the processors to carry out the method comprising:

selecting, by one or more of the processors, a second latent embedding from the codebook based upon a label; and wherein generating, by one or more of the processors, an output audio sample based upon the selected first latent embedding comprises:

combining, by one or more of the processors, the first latent embedding and the second latent embedding to generate a combined latent embedding; and decoding, by one or more of the processors, the combined latent embedding to generate the output audio sample.

18. The system of claim 17, wherein selecting, by one or more of the processors, a second latent embedding from the codebook based upon a label comprises:

sampling, by one or more of the processors, a probability distribution over the codebook conditioned on the label.

19. The system of claim 15, wherein the instructions further cause one or more of the processors to carry out the method comprising:

obtaining, by one or more of the processors, second acoustic feature data;

selecting, by one or more of the processors, a third latent embedding from the codebook based upon processing the second acoustic feature data using the acoustic machine learning model; and wherein generating, by one or more of the processors, an output audio sample based upon the selected first latent embedding comprises:

combining, by one or more of the processors, the first latent embedding and the third latent embedding to generate a combined latent embedding; and decoding, by one or more of the processors, the combined latent embedding to generate the output audio sample.

20. The system of claim 15, wherein the acoustic machine learning model has been trained using a training method comprising:

obtaining, by one or more of the processors, a training audio sample;

obtaining, by one or more of the processors, training acoustic feature data comprising a value for one or more audio characteristics of the training audio sample;

generating, by one or more of the processors, a first training latent embedding based upon processing the training acoustic feature data using the acoustic machine learning model;

generating, by one or more of the processors, a second training latent embedding based upon processing the training audio sample using an encoder machine learning model;

determining, by one or more of the processors, a value of a loss function, wherein the loss function comprises an acoustic loss term based upon a comparison between the first and second training latent embeddings; and updating, by one or more of the processors, the acoustic machine learning model based upon the value of the loss function.

* * * * *